(12) United States Patent
Gosis et al.

(10) Patent No.: US 7,789,109 B2
(45) Date of Patent: Sep. 7, 2010

(54) EXPANSIBLE AND COLLAPSIBLE PRE-CONDITIONED AIR SUPPLY HOSE CONDUIT

(75) Inventors: Anatoly Gosis, Palatine, IL (US); Scott Takayuki Koizumi, Fairfield, CA (US); Folkert Fred Koch, San Ramon, CA (US)

(73) Assignee: Illinois Tool Works Inc., Glenview, IL (US)

( * ) Notice: Subject to any disclaimer, the term of this patent is extended or adjusted under 35 U.S.C. 154(b) by 858 days.

(21) Appl. No.: 11/681,657

(22) Filed: Mar. 2, 2007

(65) Prior Publication Data
US 2007/0215227 A1   Sep. 20, 2007

Related U.S. Application Data

(60) Provisional application No. 60/781,844, filed on Mar. 13, 2006.

(51) Int. Cl.
*F16L 11/00* (2006.01)
(52) U.S. Cl. .............. 138/118; 138/119; 138/178; 138/177
(58) Field of Classification Search ............ 138/119, 138/118, 177, 178
See application file for complete search history.

(56) References Cited

U.S. PATENT DOCUMENTS

| 996,515 | A | * | 6/1911 | Peace | 138/118 |
| 4,015,635 | A | * | 4/1977 | Goransson | 138/119 |
| 2002/0017331 | A1 | * | 2/2002 | Renaud | 138/121 |

FOREIGN PATENT DOCUMENTS

| DE | 1628141 | 4/1971 |
| EP | 0284296 | 9/1988 |
| GB | 191316575 | 0/1914 |

* cited by examiner

*Primary Examiner*—Patrick F Brinson
(74) *Attorney, Agent, or Firm*—Fletcher Yoder (57) ABSTRACT

An expansible and collapsible tubular conduit, which is especially adapted for use in supplying pre-conditioned air to an aircraft while the aircraft is located upon the ground and is being serviced, comprises a plurality of annular fabric membranes which are connected to the opposite sides of a plurality of annular structural dividers or frame members in a continuously repetitive alternating manner. The structural combination or assembly comprising the fabric membranes and the structural dividers or frame members renders the tubular conduit readily expansible and contractible in the form of a spring or accordion so as to be capable of being easily and rapidly deployed and stowed, as well as to be capable of being stored in a relatively compact state or mode.

20 Claims, 3 Drawing Sheets

EXPANSIBLE AND COLLAPSIBLE PRE-CONDITIONED AIR SUPPLY HOSE CONDUIT

CROSS REFERENCE RELATED TO APPLICATION

This application claims priority to U.S. Provisional Application No. 60/781,844, filed on Mar. 13, 2006, which is hereby incorporated by reference.

FIELD OF THE INVENTION

The present invention relates generally to tubular fluid conduits, and more particularly to a new and improved tubular fluid conduit which is especially adapted for use in supplying pre-conditioned air to an aircraft while, for example, the aircraft is located upon the ground and being serviced, during which time the aircraft is unable to generate its own supply of conditioned air for the crew and passengers, wherein the tubular conduit is fabricated from a plurality of annular fabric membranes which are connected to the opposite sides of a plurality of annular structural dividers or frame members in a continuously repetitive alternating manner. The plurality of annular plastic dividers or frame members may all have the same diametrical extent so as to be universally useable throughout the entire longitudinal extent of the tubular fluid conduit, or alternatively, two differently sized dividers or frame members can be utilized in order to render the overall structure of the tubular conduit more cost-effective as well as to permit, for example, oppositely disposed end portions of the tubular conduit assembly to be readily connected both to the heating/air-conditioning supply unit as well as to the aircraft inlet port located on board the aircraft. In addition, the structural combination comprising the fabric membranes and structural dividers is expansible and contractible so as to render the tubular conduit readily capable of being easily and rapidly deployed and stowed, as well as being capable of being stored in a relatively compact state or mode.

BACKGROUND OF THE INVENTION

When an aircraft is located upon the ground and is being serviced, various services are required to be supplied to the aircraft, such as, for example, electrical power, pre-conditioned air, and the like. In connection with the provision of the pre-conditioned air to the aircraft, a suitable heating/air-conditioning unit is used, and accordingly, a first end portion of the tubular supply conduit is fluidically connected in an air-tight manner to the heating/air-conditioning unit while a second end portion of the tubular supply conduit is fluidically connected in an air-tight manner to a suitable air inlet port located on board the aircraft. The tubular conduit must be able to perform and remain flexible under various weather or environmental conditions, such as, for example, hot temperatures, cold temperatures, dry atmospheric conditions, humid atmospheric conditions, rain, snow, ice, and the like, and it must be capable of satisfying various operational parameters. For example, the tubular conduit must be rugged and durable in view of the fact that it is often moved or dragged over the various regions of the tarmac or the ground areas surrounding the airport terminal. In addition, the tubular conduit must be capable of being easily and rapidly deployed, easily and rapidly stowed, and capable of being stored in a relatively compact state. Still yet further, it is necessary that such tubular fluid conduits be capable of being easily and readily fabricated so as to comprise various or different predetermined length dimensions.

Various means or methods of fabricating such tubular fluid conduits, having such different length dimensions, have been previously proposed, however, such conventional, PRIOR ART tubular fluid conduits are all basically or substantially similar in that separate tubular fluid conduit sections are adapted to be mated and secured together by means of various different fasteners. Examples of such conventional, PRIOR ART tubular fluid conduit systems, and the techniques for fabricating the same, are disclosed, for example, within U.S. Pat. No. 6,443,499 which issued to Jenum on Sep. 3, 2002, U.S. Pat. No. 6,286,876 which issued to Jasperse et al. on Sep. 11, 2001, and U.S. Pat. No. 5,368,341 which issued to Larson on Nov. 29, 1994. As can be readily appreciated from such PRIOR ART patents, separate adjacent sections of the overall tubular fluid conduit are attached together by means of, for example, zipper type fasteners, VELCRO® fasteners, and the like. It can be further appreciated, however, that while such fabrication techniques are quite satisfactory from the viewpoint of initially fabricating, forming, or erecting the tubular fluid conduit, such fastening means do not truly address the additionally important issues of providing the overall tubular fluid conduit with means for effectively enabling the relatively easy and rapid deployment of the tubular fluid conduit, the relatively easy and rapid stowing of the tubular fluid conduit, or the capability of the tubular fluid conduit to be stored in a relatively compact mode and space. In addition, it is also noted that such conventional, PRIOR ART tubular fluid conduits have a predetermined, constant diametrical extent, and therefore, such tubular fluid conduits can only be utilized in connection with fluid flow systems which employ tubular fluid conduits having a predetermined constant diametrical extent. To the contrary, as is well known, for example, within the aircraft servicing industry, tubular fluid conduits utilized for supplying pre-conditioned air to aircraft being serviced need to comprise tubular fluid conduits which have relatively large and relatively small diametrical extents upon the oppositely disposed end portions thereof such that the tubular fluid conduits can effectively be fluidically connected both to the heating/air-conditioning supply unit as well as to the aircraft inlet port located on board the aircraft.

Accordingly, there is a need in the art for a new and improved tubular fluid conduit which can be easily and rapidly fabricated or erected so as to have predeterminedly desired or required length dimensions, which can be easily and rapidly deployed, which can be easily and rapidly stowed, which can be stored in a relatively compact mode and space, and which can not only have predeterminedly desired or required diametrical dimensions but, in addition, may have different diametrical extents at the opposite ends thereof so as to easily and readily be capable of respectively interfacing with or attaching to both the heating/air-conditioning supply unit and the aircraft inlet port located on board the aircraft.

SUMMARY OF THE INVENTION

The foregoing and other objectives are achieved in accordance with the teachings and principles of the present invention through the provision of a new and improved tubular conduit which is especially adapted for use in supplying pre-conditioned air to an aircraft while, for example, the aircraft is located upon the ground and is being serviced, during which time, for example, the aircraft is unable to generate its own supply of conditioned air for the crew and passengers. The tubular conduit comprises a plurality of annular fabric membranes which are connected to the opposite sides of a plurality of annular structural dividers or frame members in a continuously repetitive alternating manner. The plurality of annular plastic dividers or frame members may all have the same diametrical extent so as to be universally useable throughout the entire longitudinal extent of the tubular fluid conduit, or alternatively, two differently sized dividers or frame members can be utilized in order to render the overall structural assembly of the tubular conduit more cost-effective as well as to permit, for example, oppositely disposed end portions of the tubular conduit assembly to be readily connectible both to the heating/air-conditioning supply unit as well as to the aircraft inlet port located on board the aircraft. In addition, the structural combination or assembly comprising the fabric membranes and the structural dividers renders the tubular conduit readily expansible and contractible in the form of a spring or accordion so as to be capable of being easily and rapidly deployed and stowed, as well as to be capable of being stored in a relatively compact state or mode.

BRIEF DESCRIPTION OF THE DRAWINGS

Various other features and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE PREFERRED EMBODIMENT

Figure 1:
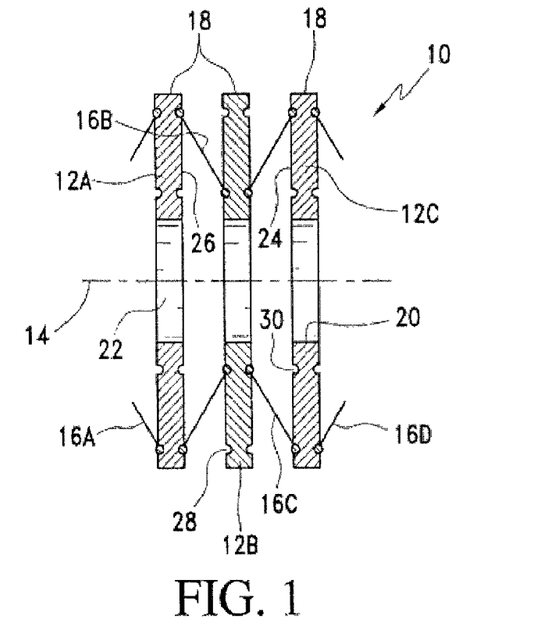
FIG. 1 is a schematic, cross-sectional view of a section of the new and improved tubular fluid conduit which has been constructed in accordance with the principles and teachings of the present invention and which shows the cooperative parts thereof.

Referring now to the drawings, and more particularly to FIG. 1 thereof, a new and improved tubular fluid conduit, constructed in accordance with the principles and teachings of the present invention, is disclosed and is generally indicated by the reference character 10. It is seen that the tubular conduit 10 comprises a plurality of annular dividers or frame members 12A-12C which are axially spaced from each other, as taken along the longitudinal axis 14 of the tubular conduit 10, and a plurality of fabric membranes 16A-16D which are interposed between, and which are adapted to be fixedly connected to, the plurality of annular dividers or frame members 12A-12C. More particularly, as can be better appreciated as a result of additional reference being made to FIGS. 5 and 8, while each one of the annular dividers or frame members 12A-12C can have, in accordance with the teachings and principles of the present invention, any one of several different predetermined geometrical configurations, it is seen, for example, that, in accordance with a first embodiment of the annular dividers or frame members 12A-12C, as exemplified by means of the annular divider or frame member 12A as disclosed within FIGS. 5 and 8, the annular dividers or frame members 12A-12C comprise discs or plates having substantially circular configurations. Accordingly, each one of the circular dividers or frame members 12A-12C is seen to be defined by means of a radially outer or external peripheral or circumferential edge portion 18, a radially inner or internal peripheral edge portion 20 spaced radially inwardly from the outer or external peripheral or circumferential edge portion 18, and a central, axially located through-bore 22 which in effect forms part of the fluid flow path defined within and extending through the tubular conduit 10.

Figure 5:
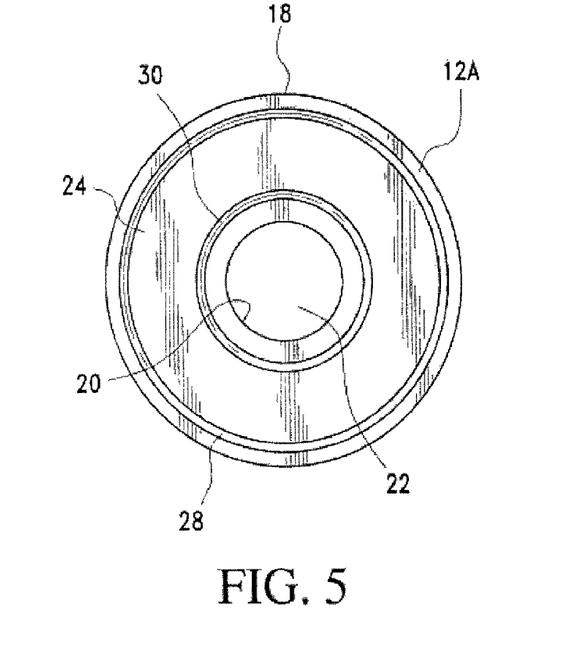
FIGS. 5-7 are front elevational views of several different structural dividers or frame members, having several different geometrical configurations, which can be utilized within the new and improved tubular fluid conduit of the present invention as illustrated within FIG. 1 when respectively used mounting particular ones of the several different membranes as illustrated within FIGS. 2-4.
Figure 8:
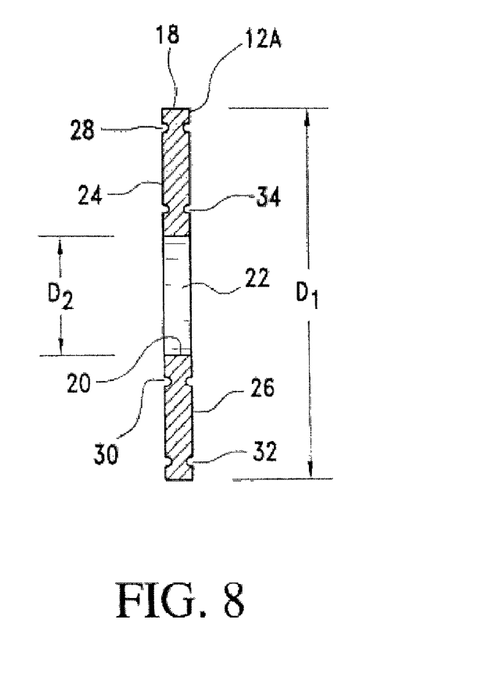
FIG. 8 is a cross-sectional view of the structural divider or frame member as illustrated within FIG. 5 as taken along the lines 5-5 of FIG. 5.

Each one of the dividers or frame members 12A-12C further comprises oppositely disposed front and rear surfaces or sides 24, 26, and as can further seen and appreciated from FIGS. 1, 5, and 8, the front surface or side 24 of each divider or frame member 12A-12C is provided with a first, radially outer annular recess 28 which is formed within the front surface or side 24 of the divider or frame member 12A-12C so as to be disposed at a position which is located immediately adjacent to the outer or external peripheral or circumferential edge portion 18 of the divider or frame member 12A-12C. In a similar manner, the front surface or side 24 of each divider or frame member 12A-12C is also provided with a second, radially inner annular recess 30 which is formed within the front surface or side 24 of each divider or frame member 12A-12C so as to be disposed at a position which is located immediately adjacent to the inner or internal peripheral edge portion 20 of the divider or frame member 12A-12C. Still yet further, it is seen that the rear surface or side 26 of each divider or frame member 12A-12C is provided with a first, radially outer annular recess 32 which is formed within the rear surface or side 26 of the divider or frame member 12A-12C so as to be disposed at a position which is located immediately adjacent to the outer or external peripheral or circumferential edge portion 18 of the divider or frame member 12A-12C, and in a similar manner, the rear surface or side 26 of each divider or frame member 12A-12C is also provided with a second, radially inner annular recess 34 that is formed within the rear surface or side 24 of each divider or frame member 12A-12C so as to be disposed at a position which is located immediately adjacent to the inner or internal peripheral edge portion 20 of the divider or frame member 12A-12C.

Figure 2:
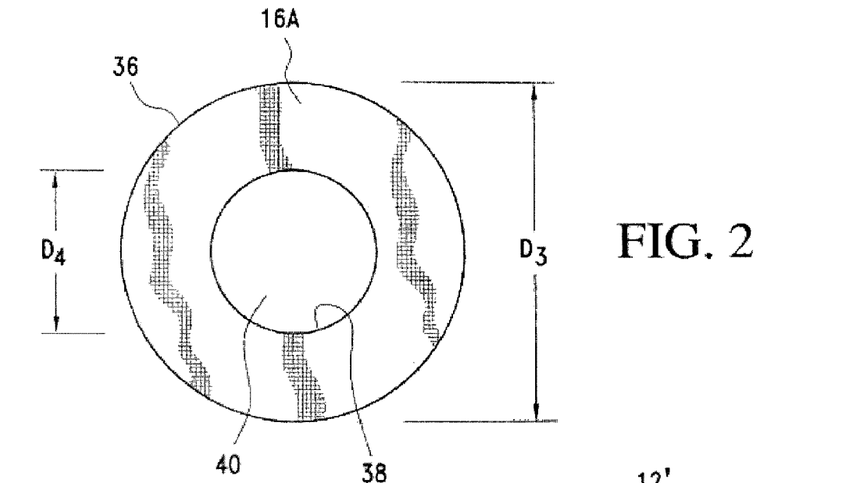
FIGS. 2-4 are front elevational views of several different membranes, having several different geometrical configurations, which can be utilized within the new and improved tubular fluid conduit of the present invention as illustrated within FIG. 1.

With reference now being additionally made to FIG. 2, it is seen that while each one of the annular fabric membranes 16A-16D can have, in accordance with the teachings and principles of the present invention, any one of several different predetermined geometrical configurations wherein, it is seen, for example, that, in accordance with a first embodiment of the annular fabric membranes 16A-16D, as exemplified by means of the annular fabric membrane 16A as disclosed within FIG. 2, the annular fabric membranes 16A-16D comprise annular structures which have substantially circular configurations so as to effectively match or correspond with the geometrical configurations of the annular dividers or frame members 12A-12C to which they will be attached as will be described shortly hereinafter. More particularly, in connection with the actual structure comprising each one of the fabric membranes 16A-16D, it is initially noted that each one of the fabric membranes 16A-16D is preferably manufactured from a suitably rugged and durable material, such as, for example, a material selected from the family of which GORE-TEX® is a representative example. In addition, it is seen that each one of the fabric membranes 16A-16D, in a manner similar to that of each one of the dividers or frame members 12A-12C, comprises a substantially flat disc having a radially outer or external peripheral or circumferential edge portion 36, a radially inner or internal peripheral edge portion 38 spaced radially inwardly from the outer or external peripheral or circumferential edge portion 36, and a central, axially located through-bore 40 which, together with each one of the through-bores 22 defined within each one of the plurality of dividers or frame members 12A-12C, effectively forms part of the fluid flow path defined within and extending through the tubular conduit 10.

As has been noted hereinbefore, the plurality of fabric membranes 16A-6D are adapted to be fixedly connected to the plurality of dividers or frame members 12A-12C in an alternating manner. The manner in which the plurality of fabric membranes 16A-16D are respectively attached to the plurality of dividers or frame members 12A-12C will now be described with specific reference being made to FIGS. 1, 2, 5, and 8. More particularly, for example, the first fabric membrane 16A is adapted to have its radially outer peripheral edge portion 36 secured within the first, radially outer annular recess 28 which has been formed within the front side surface 24 of the first divider or frame member 12A, while subsequently, the second fabric membrane 16B is similarly adapted to have its radially outer peripheral edge portion 36 secured within the first, radially outer annular recess 32 which has been formed within the rear side surface 26 of the first divider or frame member 12A. Still further, in order to effectively complete the mounting of the second fabric membrane 16B within the tubular conduit assembly 10, the second fabric membrane 16B is adapted to have its radially inner peripheral edge portion 38 secured within the first, radially inner annular recess 30 which has been formed within the front side surface 24 of the second divider or frame member 12B. Assuming, for example, that the first fabric membrane 16A also effectively forms or defines the leading end of the tubular conduit 10, it is to be appreciated that the inner peripheral edge portion 38 of the first fabric membrane 16A will be fixedly connected to a suitable adaptor or connector, not shown, such that the forward or leading end portion of the tubular conduit 10 can be fixedly secured to an air inlet port, such as, for example, the air inlet port located on board an aircraft, also not shown, so as to permit the air, which is being supplied to the air inlet port, to in fact be fluidically conducted thereinto.

Continuing further, it is seen that the radially inner peripheral edge portion 38 of the third fabric membrane 16C will be fixedly connected to or within the radially inner annular recess 34 which has been formed within the rear side surface 26 of the second divider or frame member 12B, and in a manner similar to that of the first fabric membrane 16A, the radially outer peripheral edge portion 36 of the third fabric membrane 16C will be fixedly connected to or within the first, radially outer annular recess 28 which has been formed within the front side surface 24 of the third divider or frame member 12C. Lastly, as illustrated within FIG. 1, and in a manner similar to that as previously described in connection with the fixation of the second fabric membrane 16B, it is seen that the radially outer peripheral edge portion 36 of the fourth fabric membrane 16D is adapted to be fixedly secured within the first, radially outer recess 32 which has been formed within the rear side surface 26 of the third divider or frame member 12C. The aforenoted fabrication process or technique can of course be repeated as many times as is necessary or desired in order to fabricate or form any tubular conduit 10 having a desired or required longitudinal length dimension. It is also to be noted that when the upstream or rear end portion of the tubular conduit 10 is to be operatively and fluidically connected to a suitable source or supply, such as, for example, a suitable heating/air-conditioning supply unit, not shown, whereby pre-conditioned air can be supplied to an aircraft being serviced, a fabric membrane, similar to either one of the first or third fabric membranes 16A, 16C, that is, a fabric membrane having the particular orientation as that of either one of the first or third fabric membranes 16A, 16C, will be fixedly connected to a suitable adaptor or connector, not shown, such that the rearward or trailing end portion of the tubular conduit 10 can in fact be fixedly secured to an air outlet port, such as, for example, the air outlet or supply port which is located upon the heating/air-conditioning supply unit, so as to be fluidically connected thereto and be capable of receiving the outputted pre-conditioned air to be supplied to the air inlet port located on board the aircraft.

In order to in fact achieve the fixation of the various fabric membranes 16A-16D to the various dividers or frame members 12A-12C, in the manner that has been illustrated within FIG. 1, suitable fastener means are to be employed. Examples of such fastener means are illustrated within FIGS. 9 and 10 and are seen to respectively comprise, for example, relatively large and relatively small diameter O-ring members 42, 44, which are adapted to be respectively fixedly secured within the first, radially outer recesses 28, 32 formed within the front and rear side surfaces 24, 26 of the dividers or frame members 12A-12C, and within the second, radially inner recesses 30, 34 which are also formed within the front and rear side surfaces 24, 26 of the dividers or frame members 12A-12C.

Figure 9:
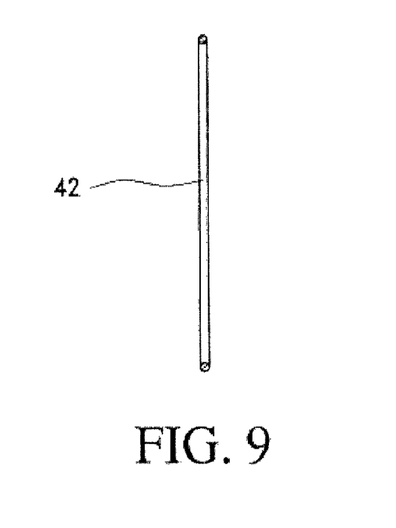
FIG. 9 is a cross-sectional view of one of the large-diameter O-rings which is adapted to be fixedly mounted within one of the large-diameter annular recessed portions defined within one of the forward or rear surface portions of each structural divider or frame member in order to fixedly secure the outer annular region of each one of the fabric membranes upon each forward or rear surface portion of each structural divider or frame member in accordance with the structural assembly requirements characteristic of the tubular fluid conduit of the present invention.
Figure 10:
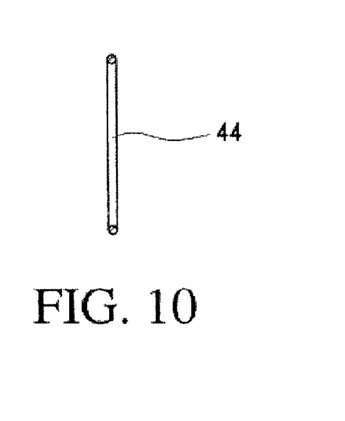
FIG. 10 is a cross-sectional view of one of the small-diameter O-rings which is adapted to be fixedly mounted within one of the small-diameter annular recessed portions defined within one of the forward or rear surface portions of each structural divider or frame member in order to fixedly secure the inner annular region of each one of the fabric membranes upon each forward or rear surface portion of each structural divider or frame member in accordance with the structural assembly requirements characteristic of the tubular fluid conduit of the present invention.

It can therefore be appreciated that when, for example, the relatively large diameter O-rings 42 are fixedly secured, for example, within any one of the first, radially outer recesses 28, 32, which are respectively formed within the front and rear side surfaces 24, 26 of any one of the dividers or frame members 12A-12C, then the radially outer peripheral edge portions 36 of any one of the fabric membranes 16A-16D can be fixedly secured within such first, radially outer recesses 28, 32, respectively formed within the front and rear side surfaces 24, 26 of any one of the dividers or frame members 12A-12C, as a result of the radially outer peripheral edge portion 36 of the particular one of the fabric membranes 16A-16D effectively being trapped between the relatively large diameter O-ring member 42 and the particular one of the first, radially outer recesses 28, 32 respectively formed within the front and rear side surfaces 24, 26 of any one of the dividers or frame members 12A-12C. In a similar manner, when, for example, the relatively small diameter O-rings 44 are fixedly secured, for example, within any one of the second, radially inner recesses 30, 34, which are respectively formed within the front and rear side surfaces 24, 26 of any one of the dividers or frame members 12A-12C, then the radially inner peripheral edge portions 38 of any one of the fabric membranes 16A-16D can be fixedly secured within such second, radially inner recesses 30, 34, respectively formed within the front and rear side surfaces 24, 26 of any one of the dividers or frame members 12A-12C, as a result of the radially inner peripheral edge portion 38 of the particular one of the fabric membranes 16A-16D effectively being trapped between the relatively small diameter O-ring member 44 and the particular one of the second, radially small recesses 30, 34 respectively formed within the front and rear side surfaces 24, 26 of any one of the dividers or frame members 12A-12C.

It has been previously noted that the tubular conduit 10 of the present invention is particularly adapted for use in connection with, for example, the supply of pre-conditioned air to an aircraft that is being serviced wherein an upstream or rear end portion of the tubular conduit 10 is to be operatively and fluidically connected by means of a suitable connector or adaptor to the air outlet or supply port of a suitable source or supply of pre-conditioned air being outputted, for example, by means of a suitable heating/air-conditioning supply unit s as to receive the pre-conditioned air therefrom, while in a similar manner, the downstream or forward end portion of the tubular conduit 10 is to be operatively and fluidically connected by means of a suitable connector or adaptor to an air inlet port which is, for example, located on board the aircraft so as to supply the pre-conditioned, outputted from the heating/air-conditioning unit, to the aircraft. Accordingly, in order to readily facilitate the respective structural and fluidic connections of the upstream and downstream end portions of the tubular conduit 10 to the outlet port of the heating/air-conditioning unit and to the inlet port on board the aircraft, and appreciating the fact that normally or conventionally, the outlet ports defined upon most heating/air-conditioning units for supplying pre-conditioned air to aircraft are approximately fourteen inches (14.00") in diameter, while the air inlet ports defined on board aircraft are approximately eight inches (8.00") in diameter, the outer diametrical extent D1 of each one of the dividers or frame members 12A-12C is approximately fourteen inches (14.00"), while the inner diametrical extent D2 of each one of the dividers or frame members 12A-12C is approximately eight inches (8.00").

Continuing further, it can be appreciated that each one of the fabric membranes 16A-16D will have an outer diametrical extent D3 which will be slightly less than the outer diametrical extent D1 of each one of the dividers or frame members 12A-12C in view of the fact that each one of the first, radially outer recesses 28, 32, respectively formed within the side surfaces 24, 26 of each one of the dividers or frame members 12A-12C, and within which the outer peripheral edge portions 36 of the fabric membranes 16A-16D are to be located when respectively attached to the dividers or frame members 12A-12C, are located radially inwardly from the external peripheral edge portion 18 of each one of the dividers or frame members 12A-12C by means of a radial distance which may be within the range of 0.25-1.00 inches (0.25-1.00"). In a similar manner, it can likewise be appreciated that each one of the fabric membranes 16A-16D will also have an inner diametrical extent D4 which will be slightly larger than the inner diametrical extent D2 of each one of the dividers or frame members 12A-12C in view of the fact that each one of the second, radially inner recesses 30, 34, respectively formed within the side surfaces 24, 26 of each one of the dividers or frame members 12A-12C, and within which the inner peripheral edge portions 38 of the fabric membranes 16A-16D are to be located when respectively attached to the dividers or frame members 12A-12C, are located radially outwardly from the internal peripheral edge portion 20 of each one of the dividers or frame members 12A-12C by means of a radial distance which may also be within the range of 0.25-1.00 inches (0.25-1.00").

As can also be seen from FIG. 1, and in accordance with the first illustrated embodiment of the new and improved tubular conduit 10 constructed in accordance with the principles and teachings of the present invention, all of the dividers or frame members 12A-12C comprise identical structural components which renders the construction of the tubular fluid conduit 10 relatively easy in that regardless of which particular one of the dividers or frame members 12A-12C are being used to integrally connect together particular ones of the fabric membranes 16A-16D, any one of the dividers or frame members 12A-12C can in fact be used or effectively interchanged. However, it is noted that, for example, as illustrated in connection with the second or intermediate divider or frame member 12B, both of the fabric membranes 16B and 16C are only connected to the intermediate divider or frame member 12B within the radially inner regions thereof, that is, within the annular recesses 30, 34 respectively formed within the oppositely disposed side surfaces 24, 26 of the divider or frame member 12B. Accordingly, it can be appreciated further that the radially outer portion of each alternatively disposed divider or frame member, such as, for example, divider or frame member 12B, is not really being utilized as a structural component for fastening or securing the fabric membranes to its oppositely disposed side surfaces 24, 26.

Figure 11:
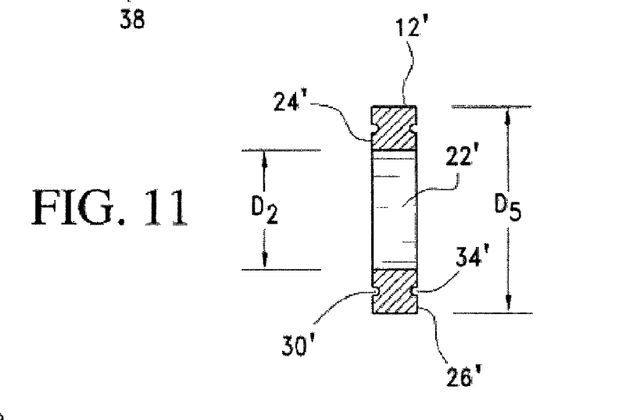
FIG. 11 is a schematic, cross-sectional view of a second embodiment of a divider or frame member component which can be utilized within the new and improved tubular fluid conduit assembly as illustrated within FIG. 1.

Therefore, in the interest of rendering the fabrication of the plurality of dividers or frame members 12A-12C more economical or cost-effective, a second embodiment divider or frame member 12', as illustrated, for example, within FIG. 11, is envisioned wherein the diametrical extent of the same is substantially less than that characteristic of any one of the dividers or frame members 12A-12C by effectively eliminating the radially outer portion of each one of such dividers or frame members, that is, those portions of the dividers or frame members 12A-12C which are located radially beyond the annular recesses 30, 34. In this manner, the fabrication of dividers or frame members, similar to divider or frame member 12', can result in a substantial cost-savings from a materials point of view. As an example, the outer diametrical extent D5 of the second embodiment divider or frame member 12' could be approximately ten inches (10.00") wherein the divider or frame member 12' would nevertheless have the same radially inner diametrical extent D2 as that of the dividers or frame members 12A-12C. As can be readily appreciated, the volumetric material required to manufacture or fabricate the second embodiment divider or frame member 12' would be within the range of approximately seventy to seventy-five percent (70-75%) less than that required to manufacture or fabricate any one of the first embodiment dividers or frame members 12A-12C.

With reference again being made to FIG. 1, it is to additionally be appreciated, as can readily be understood from the structural assembly comprising the new and improved tubular fluid conduit 10 as disclosed within FIG. 1, that the structural assembly of the new and improved tubular fluid conduit 10, comprising the plurality of dividers or frame members 12A-12C which are effectively interconnected together by means of the plurality of fabric membranes 16A-16D, renders the new and improved tubular fluid conduit 10 readily expansible or contractible, in a mode similar to that of an accordion, between an extended or deployed position, and a collapsed or stowed position. Such structure, in turn, renders the new and improved tubular fluid conduit 10 especially or uniquely adapted for compact storage of the same. More particularly, as can be best understood from FIG. 1, the tubular fluid conduit 10 is shown in its relatively expanded or deployed position, however, it can be further appreciated that when the tubular fluid conduit 10 is to be axially contracted toward its collapsed or stowed position, the plurality of dividers or frame members 12A-12C may simply be moved toward each other such that respective side surfaces 24 of each one of the dividers or frame members 12A-12C will effectively be disposed in contact with or immediately adjacent to the side surfaces 26 of adjacent ones of the dividers or frame members 12A-12C. It is also to be understood that, in view of the angular orientation of the plurality of fabric membranes 16A-16D, respectively interposed between adjacent ones of the plurality of dividers or frame members 12A-12c, and with respect to the axis 14 of the tubular conduit 10, the plurality of fabric membranes 16A-16D are pre-disposed toward collapsing internally within the confines of the tubular fluid conduit assembly 10, as defined, for example, by means of the outer or external peripheral edge portions 18 of the dividers or frame members 12A-12C, so as to permit the overall structure of the tubular fluid conduit assembly 10 to achieve the most compact mode or state possible.

Figures 3, 4:
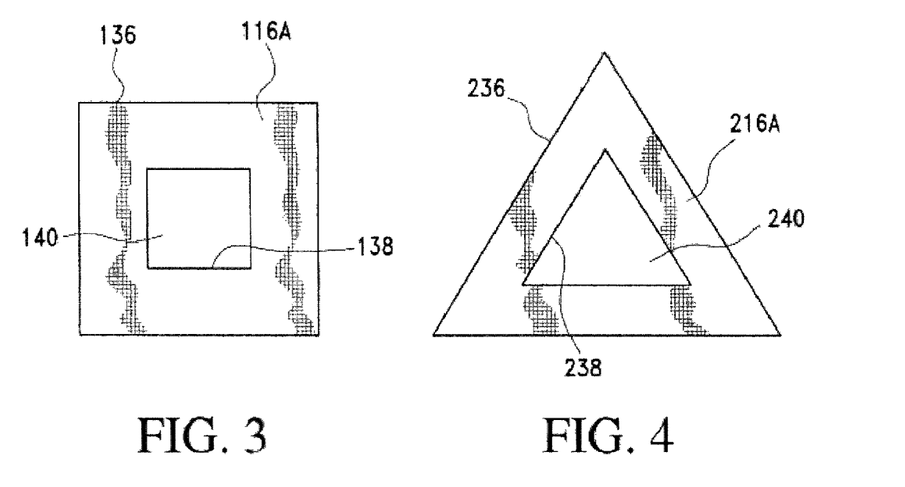
Figures 6, 7:
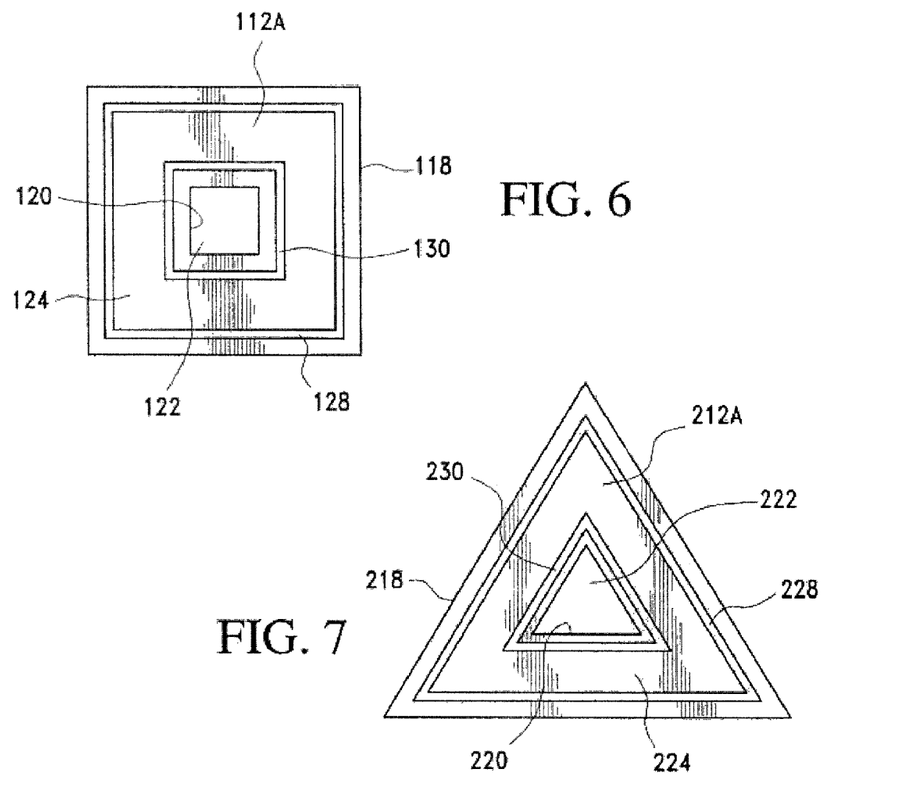

With reference lastly being made to FIGS. 3 and 4, as well as to FIGS. 6 and 7, while the fabric membranes 16A-16D and dividers or frame members 12A-12C, utilized within the tubular fluid conduit assembly 10 of FIG. 1, have been respectively disclosed as having substantially annular circular configurations as disclosed within FIGS. 2 and 5, other fabric membranes and dividers or frame members, having different geometrical configurations, can likewise be utilized. Accordingly, as respectively disclosed within FIGS. 3 and 4, and FIGS. 6 and 7, the fabric membranes and dividers or frame members, as respectively exemplified by means of fabric membranes 116A, 216A, and dividers or frame members 112A, 212A, can have, for example, substantially square-shaped configurations or substantially triangular configurations. It is noted that the various component parts of the fabric membranes 116A, 216A and dividers or frame members 112, 212A as disclosed within FIGS. 3 and 4, and FIGS. 6 and 7, are structurally similar to the fabric membrane 16A and divider or frame member 12A as respectively disclosed within FIGS. 2 and 5, and accordingly, components parts of the fabric membranes 116A, 216A and dividers or frame members 112, 212A as disclosed within FIGS. 3 and 4, and FIGS. 6 and 7, which correspond to those components parts of the fabric membrane 16A and divider or frame member 12A, as disclosed within FIGS. 2 and 5, are denoted by similar reference characters except that they are within the 100 and 200 series. It is to be lastly noted that, in connection with any one of the particular embodiments of the fabric membranes 16A-16D, 116A, 216A, and the corresponding dividers or frame members 12A-12C, 112A, 212A, in view of the fact that the fabric membranes 16A-16D, 116A, 216A are all disposed internally within the external or outer peripheral confines of their respective dividers or frame members 12A-12C, 112A, 212A, then it can be appreciated that the dividers or frame members 12A-12C, 112A, 212A effectively prevent the outer surface portions of the fabric membranes from being disposed in contact with the ground or tarmac areas and thereby, in turn, effectively prevent such regions of the fabric membranes from being accordingly abraded.

Thus, it may be seen that in accordance with the principles and teachings of the present invention, there has been disclosed a new and improved tubular fluid conduit which is especially adapted for use in supplying pre-conditioned air to an aircraft, wherein the tubular fluid conduit comprises a plurality of annular fabric membranes which are connected to the opposite sides of a plurality of annular structural dividers or frame members in a continuously repetitive alternating manner such that particular tubular conduits can be manufactured or fabricated in accordance with any desired or required length dimensions. The various fabric membranes and dividers or frame members can have different geometrical configurations, and opposite ends of the tubular conduit are readily connectible to the heating/air-conditioning supply unit as well as to the air inlet port located on board the aircraft. The structural combination or assembly comprising the fabric membranes and the structural dividers or frame members also renders the tubular conduit readily expansible and collapsible in the form of a spring or accordion so as to be capable of being easily and rapidly deployed and stowed, as well as to be capable of being stored in a relatively compact state or mode.

Obviously, many variations and modifications of the present invention are possible in light of the above teachings. It is therefore to be understood that within the scope of the appended claims, the present invention may be practiced otherwise than as specifically described herein.

The invention claimed is:

1. A tubular conduit, comprising:
a plurality of annular frame members wherein each one of said plurality of annular frame members has oppositely disposed side surface portions, and a central aperture defined within each one of said plurality of annular frame members so as to extend through each one of said annular frame members, from one side surface portion thereof to the other side surface portion thereof, for defining an axial pathway extending through each one of said plurality of annular frame members and through said tubular conduit;
a plurality of annular membranes respectively interposed between said plurality of annular frame members in accordance with an alternative repetitive pattern; and
means for connecting opposite edge portions of each one of said plurality of annular membranes to oppositely disposed side surface portions of adjacent ones of said plurality of annular frame members so as to achieve said alternative repetitive pattern.

2. The tubular conduit as set forth in claim 1, wherein:
each one of said plurality of annular membranes has a central aperture defined therethrough for cooperating with said central aperture defined within each one of said plurality of annular frame members so as to define said axial pathway through said tubular conduit.

3. The tubular conduit as set forth in claim 2, wherein:
said tubular conduit comprises a tubular fluid conduit for conducting pre-conditioned air from a source of pre-conditioned air to an aircraft ventilation system along said pathway defined through said plurality of annular frame members and said plurality of annular membranes.

4. The tubular conduit as set forth in claim 1, wherein:
each one of said plurality of annular frame members comprises an annular plate having a radially outer peripheral edge portion and a radially inner peripheral edge portion; and
each one of said plurality of annular membranes comprises an annular disc having a radially outer peripheral edge portion and a radially inner peripheral edge portion.

5. The tubular conduit as set forth in claim 4, wherein:
each one of said plurality of annular frame members comprising said annular plate has a predetermined geometrical configuration; and
each one of said plurality of annular membranes comprising said annular disc has a predetermined geometrical configuration which substantially corresponds to and matches said predetermined geometrical configuration of each one of said plurality of annular frame members.

6. The tubular conduit as set forth in claim 5, wherein:
said predetermined geometrical configuration, comprising each one of said plurality of annular frame members, and said predetermined geometrical configuration, comprising each one of said plurality of annular membranes and corresponding to and matching said predetermined geometrical configuration of each one of said plurality of annular frame members, is selected from the group comprising a circle, a triangle, and a square.

7. The tubular conduit as set forth in claim 4, wherein:
a first annular recess is defined within each one of said oppositely disposed side surface portions of each one of said plurality of annular frame members so as to be disposed within the vicinity of said radially outer peripheral edge portion within which a radially outer peripheral edge portion of one of said plurality of annular membranes can be fixedly secured; and
a second annular recess is defined within each one of said oppositely disposed side surface portions of each one of said plurality of annular frame members so as to be disposed within the vicinity of said radially inner peripheral edge portion within which a radially inner peripheral edge portion of one of said plurality of annular membranes can be fixedly secured.

8. The tubular conduit as set forth in claim 7, wherein:
a radially outer peripheral edge portion of a first one of said plurality of annular membranes is fixedly connected within said first annular recess defined within the vicinity of said radially outer peripheral edge portion of said second one of said oppositely disposed side surface portions of a first one of said plurality of annular frame members;
a radially inner peripheral edge portion of said first one of said plurality of annular membranes is fixedly connected within said second annular recess defined within the vicinity of said radially inner peripheral edge portion of said first one of said oppositely disposed side surface portions of a second one of said plurality of annular frame members;
a radially inner peripheral edge portion of a second one of said plurality of annular membranes is fixedly connected within said second annular recess defined within the vicinity of said radially inner peripheral edge portion of said second one of said oppositely disposed side surface portions of said second one of said plurality of annular frame members;
a radially outer peripheral edge portion of said second one of said plurality of annular membranes is fixedly connected within said first annular recess defined within the vicinity of said radially outer peripheral edge portion of said first one of said oppositely disposed side surface portions of a third one of said plurality of annular frame members; and
a radially outer peripheral edge portion of a third one of said plurality of annular membranes is fixedly connected within said first annular recess defined within the vicinity of said radially outer peripheral edge portion of said second one of said oppositely disposed side surface portions of said third one of said plurality of annular frame members so as to complete said repetitive pattern defined by said plurality of alternative annular frame members and annular membrane.

9. The tubular conduit as set forth in claim 8, wherein:
all of said plurality of annular frame members have the same diametrical extent such that any one of said plurality of annular frame members can be utilized at any position within said repetitive pattern comprising said plurality of alternative annular frame members and annular membranes.

10. The tubular conduit as set forth in claim 8, wherein:
alternative first ones of said plurality of annular frame members have a first diametrical extent, while alternative second ones of said plurality of annular frame members have a second diametrical extent, such that said first and second ones of said plurality of annular frame members can be utilized at alternative positions within said repetitive pattern comprising said plurality of alternative annular frame members and annular membranes.

11. The tubular conduit as set forth in claim 7, wherein:
said means for connecting said opposite edge portions of each one of said plurality of annular membranes to said oppositely disposed side surface portions of adjacent ones of said plurality of annular frame members comprises O-ring members disposed within said first and second annular recesses defined within each one of said oppositely disposed side surface portions of each one of said plurality of annular frame members.

12. The tubular conduit as set forth in claim 1, wherein:
said tubular conduit has a predetermined length dimension depending upon the number of annular frame members and annular membranes fixedly secured together within said repetitive pattern.

13. The tubular conduit as set forth in claim 1, wherein:
said tubular conduit is expansible and collapsible as a result of the connections of said plurality of annular membranes to said plurality of annular frame members in accordance with said alternative pattern.

14. The tubular conduit as set forth in claim 13, wherein:
said plurality of annular frame members are disposed substantially in contact with one another when said tubular conduit is disposed in its collapsed mode; and
said plurality of annular frame members are axially spaced from each other when said tubular conduit is disposed in its expanded mode.

15. The tubular conduit as set forth in claim 8, wherein:
said tubular conduit is expansible and collapsible as a result of said connections of said plurality of annular membranes to said plurality of annular frame members in accordance with said alternative pattern.

16. The tubular conduit as set forth in claim 15, wherein:
said plurality of annular membranes are pre-disposed at a predetermined angle with respect to said axial pathway defined within said tubular conduit so as to facilitate said axial expansion and collapse of said tubular conduit.

17. The tubular conduit as set forth in claim 1, wherein:
at least some of said annular frame members have larger external diametrical extents than the external diametrical extents of said plurality of annular membranes so as to protect external surface portions of said plurality of annular membranes from abrasion when said tubular conduit is disposed in contact with abrasive surfaces.

18. The tubular conduit as set forth in claim 8, wherein:
said connections of said plurality of annular membranes to said plurality of annular frame members at said radially outer and radially inner peripheral edge portions permits said tubular conduit to be operatively connected to a first relatively large conduit at a first end portion of said tubular conduit and to a second relatively small conduit at a second opposite end portion of said tubular conduit.

19. A method of forming a tubular conduit, comprising the steps of:

providing a plurality of annular frame members wherein each one of said plurality of annular frame members has oppositely disposed side surface portions, and a central aperture defined within each one of said plurality of annular frame members so as to extend through each one of said annular frame members, from one side surface portion thereof to the other side surface portion thereof, so as to define an axial pathway extending through each one of said plurality of annular frame members and through said tubular conduit;

respectively interposing a plurality of annular membranes between said plurality of annular frame members in accordance with an alternative repetitive pattern; and connecting opposite edge portions of each one of said plurality of annular membranes to oppositely disposed side surface portions of adjacent ones of said plurality of annular frame members so as to achieve said alternative repetitive pattern.

20. The method as set forth in claim 19, further comprising the steps of:

fixedly connecting a radially outer peripheral edge portion of a first one of said plurality of annular membranes within a second one of said oppositely disposed side surface portions of a first one of said plurality of annular frame members;

fixedly connecting a radially inner peripheral edge portion of said first one of said plurality of annular membranes within said first one of said oppositely disposed side surface portions of a second one of said plurality of annular frame members;

fixedly connecting a radially inner peripheral edge portion of a second one of said plurality of annular membranes within said second one of said oppositely disposed side surface portions of said second one of said plurality of annular frame members;

fixedly connecting a radially outer peripheral edge portion of said second one of said plurality of annular membranes within said first one of said oppositely disposed side surface portions of a third one of said plurality of annular frame members; and fixedly connecting a radially outer peripheral edge portion of a third one of said plurality of annular membranes within said second one of said oppositely disposed side surface portions of said third one of said plurality of annular frame members so as to complete said repetitive pattern defined by said plurality of alternative annular frame members and annular membranes.

* * * * *